United States Patent
Bingman

(10) Patent No.: US 11,856,940 B1
(45) Date of Patent: Jan. 2, 2024

(54) MOATED SYSTEM FOR REPELLING INSECTS

(71) Applicant: Davy Russ Bingman, Joplin, MO (US)

(72) Inventor: Davy Russ Bingman, Joplin, MO (US)

(*) Notice: Subject to any disclaimer, the term of this patent is extended or adjusted under 35 U.S.C. 154(b) by 0 days.

(21) Appl. No.: 18/076,595

(22) Filed: Dec. 7, 2022

(51) Int. Cl.
*A01M 1/10* (2006.01)
*A01M 29/34* (2011.01)

(52) U.S. Cl.
CPC .................................. *A01M 29/34* (2013.01)

(58) Field of Classification Search
CPC ... A01K 5/0142; A01K 5/0114; A01M 1/103; A01M 29/34
See application file for complete search history.

(56) References Cited

U.S. PATENT DOCUMENTS

| | | | | |
|---|---|---|---|---|
| 1,248,283 A | * | 11/1917 | Derck et al. | A01M 29/34 43/109 |
| 4,357,905 A | | 11/1982 | Carpenter | |
| 4,981,108 A | | 1/1991 | Faeroe | |
| 5,031,575 A | * | 7/1991 | Phillips | A01M 29/34 119/61.53 |
| 5,205,242 A | | 4/1993 | Kasselman | |
| 5,253,609 A | | 10/1993 | Partelow et al. | |
| 5,277,149 A | | 1/1994 | East | |
| 5,564,363 A | | 10/1996 | Soffici | |
| D377,244 S | * | 1/1997 | Steininger | D30/133 |
| 5,730,083 A | * | 3/1998 | Walker | A01K 5/0142 83/699.61 |
| 6,463,878 B1 | | 10/2002 | Moody | |
| 6,471,488 B2 | * | 10/2002 | Nolan | F04B 39/121 220/663 |
| 7,146,929 B2 | * | 12/2006 | Ritchey | A01K 5/0142 119/61.53 |
| 9,386,763 B2 | * | 7/2016 | Vasudeva | A01M 1/023 |
| 10,426,154 B2 | * | 10/2019 | Sanford | A01M 1/103 |
| 2006/0075974 A1 | | 4/2006 | Kennedy | |
| 2011/0283947 A1 | * | 11/2011 | Linke | A01M 29/34 119/61.53 |
| 2016/0050861 A1 | * | 2/2016 | Abbott | A01G 27/04 47/81 |
| 2020/0107984 A1 | * | 4/2020 | Knight | A61G 15/02 |

\* cited by examiner

*Primary Examiner* — Brian E Glessner
*Assistant Examiner* — Daniel J Kenny
(74) *Attorney, Agent, or Firm* — Argus Intellectual Enterprise, LLC; Jordan Sworen; Daniel Enea

(57) ABSTRACT

A moated system for repelling insects. The moated system is a two-part system including a first body having a lip extending substantially perpendicularly along a rim, wherein the rim encloses a central area. A moat channel forms the second body and extends about a lower side of the rim, wherein the moat channel can be filled with liquid to prevent ants from crawling into the central area. A filling port having a funnel is disposed through the upper side of the rim and is positioned directly over the moat channel. The funnel extends into the moat channel to prevent the moat channel from overflowing. In some embodiments, the two-part system is in a configuration of servingware or a pet dish having an interior compartment, wherein other embodiments, the two-part system is utilized along a perimeter of a tabletop to prevent insects from accessing an upper surface thereof.

19 Claims, 6 Drawing Sheets

MOATED SYSTEM FOR REPELLING INSECTS

BACKGROUND OF THE INVENTION

The present invention relates to insect repelling systems. The moated system for repelling insects comprises a two-part system including a first body having a lip extending substantially perpendicularly along a rim, wherein the rim encloses a central area. A moat channel forms the second body and extends about a lower side of the rim, wherein the moat channel can be filled with liquid to prevent ants from crawling into the central area of the first body.

When spending time outdoors camping, picnicking, tailgating, and the like, food is available for people to share and eat. The food is often set up on tables and platters for people to grab as desired. Unfortunately, this food serves as an attractant to many ants and other insects. Consequently, people must repeatedly cover and uncover food which is difficult for people having full hands. Furthermore, many people often forget to cover food when they are done serving themselves. Pet food dishes suffer similar accessibility to ants as pet dishes are rarely, if ever, covered to allow a pet to eat or drink as needed.

Some devices are known to provide a liquid channel to prevent ants from passing into a pet dish. However, these devices fail to conceal the channel, which can be unappealing to view alongside food when ants or other insects become trapped therein. Other devices provide a channel at a base of the dish but require the channel to be filled with liquid through a lateral side of the dish, which is awkward to access unless the pourer has a secondary container with a spout for accessing the channel through the lateral side. Additionally, due to a rim extending around most pet dishes, it is difficult to see how full the channel is when liquid is being pouted therein, which leads to spillage and other messes. Therefore, there exists a need for a system that provides a moat channel disposed around an interior compartment that is concealed from view but can be easily filled and accessed when necessary.

In light of the devices disclosed in the known art, it is submitted that the present invention substantially diverges in design elements and methods from the known art and consequently it is clear that there is a need in the art for an improvement for a moated system for repelling insects. In this regard the instant invention substantially fulfills these needs.

SUMMARY OF THE INVENTION

In view of the foregoing disadvantages inherent in the known types of moated systems for repelling insects now present in the known art, the present invention provides a new moated system wherein the same can be utilized for preventing insects from accessing an interior compartment while concealing a moat channel and providing a funneled filling system.

It is an objective of the present invention to provide a moated system for repelling insects comprising a two-part system having a first body forming a rim disposed around a central area, wherein the central area is adapted to receive food and other objects thereon and a second body forming a moat channel that forms a barrier around an exterior perimeter of the central area, wherein the moat channel is adapted to be filled with liquid to prevent ants from passing the moat channel and entering the central area.

It is another objective of the present invention to provide a moated system for repelling insects comprising a lip extending perpendicularly along a perimeter of an upper side of the rim, wherein the lip extends to the moat channel and prevents lateral access from an exterior to the moat channel.

It is another objective of the present invention to provide a moated system for repelling insects wherein the first body comprises a first housing having an interior compartment with an open upper end defining the central area and wherein the second body comprises a second housing removably secured to the first housing via a friction fit, wherein the second housing is configured to receive the interior compartment within the moat channel.

It is another objective of the present invention to provide a moated system for repelling insects comprising a filling port disposed through the first body of the moated system, wherein the filling port includes a funnel that protrudes therefrom and into the moat channel to indicate when the liquid level has reached a desired level within the moat channel without overflowing the edges of the moat channel.

It is yet another objective of the present invention to provide a moated system for repelling insects wherein the two-part system is utilized along a perimeter of a tabletop to prevent ants and other insects from accessing an upper surface thereof.

It is therefore an object of the present invention to provide a new and improved moated system for repelling insects that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for preventing insects from passing a moat channel and crawling into an interior area of a housing or tabletop. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "first embodiment", "second embodiment", or "third embodiment" does not necessarily refer to the same embodiment.

Figure 1:
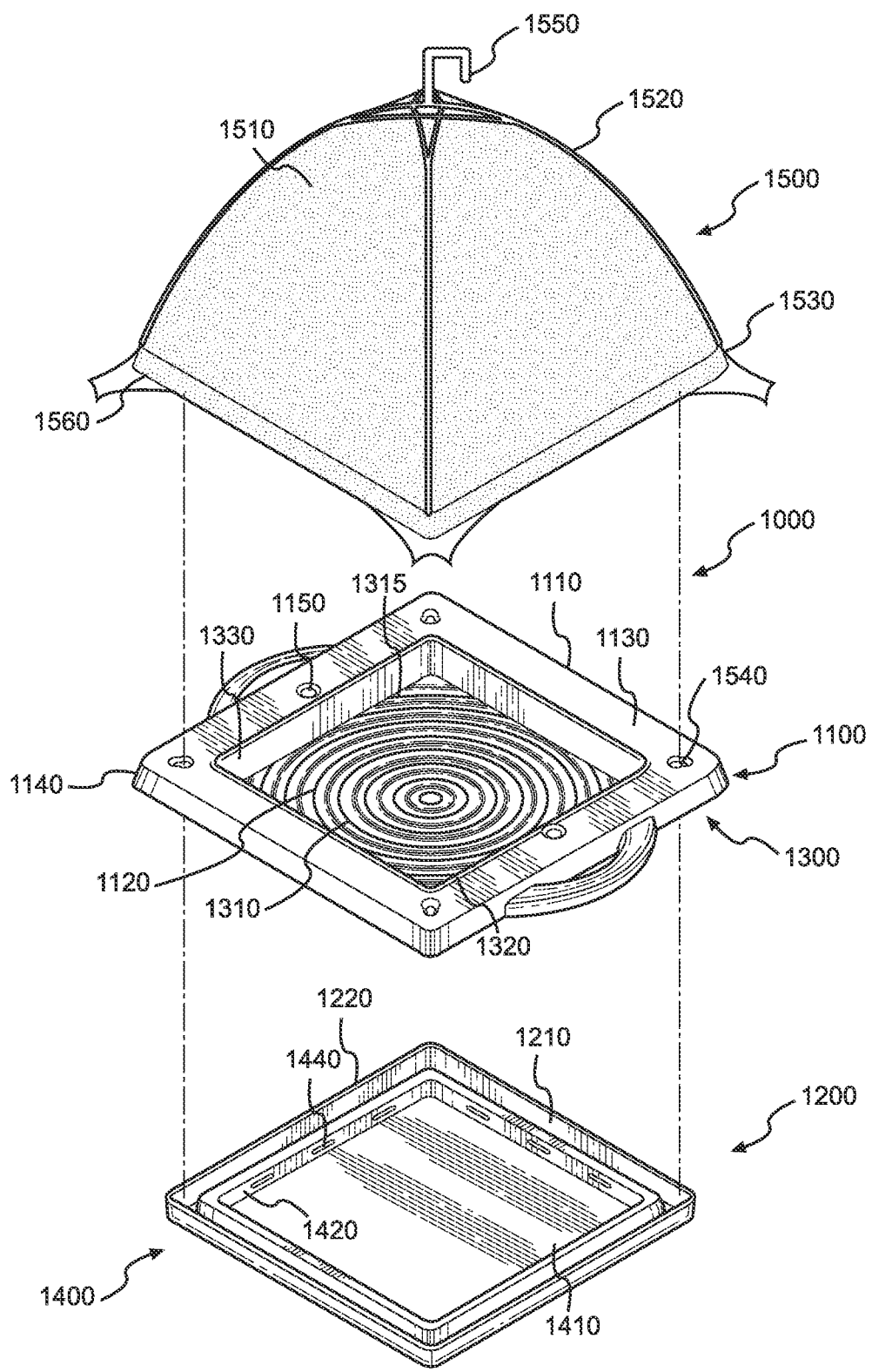
FIG. 1 shows an exploded view of a first embodiment of the moated system for repelling insects.
Figure 2:
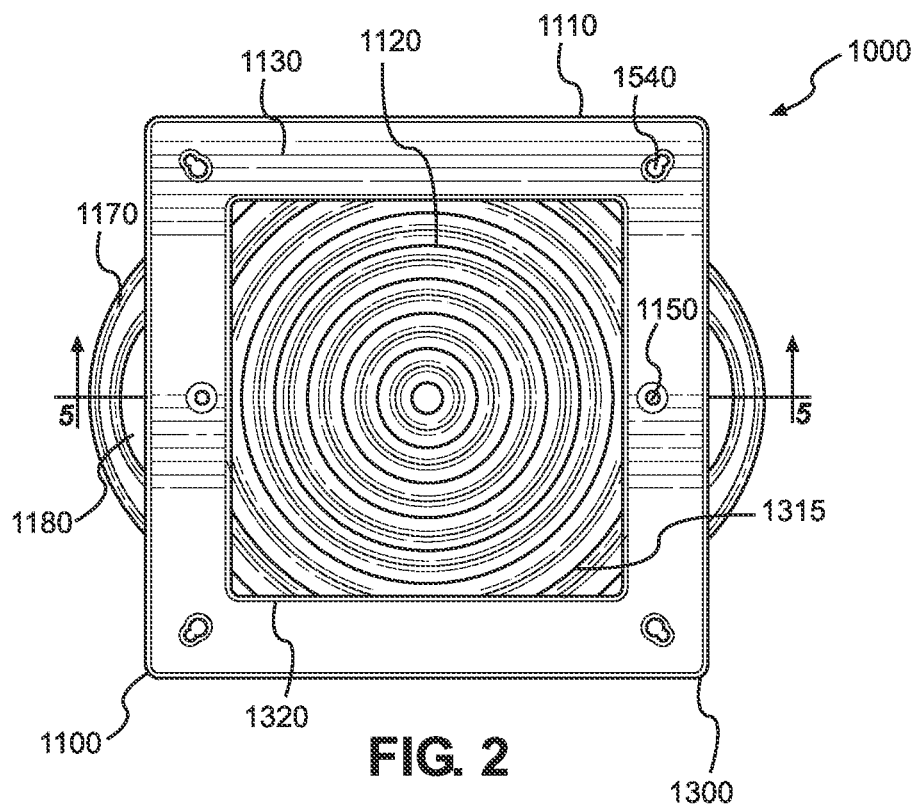
FIG. 2 shows a top planar view of the first embodiment of the moated system for repelling insects.
Figure 3:
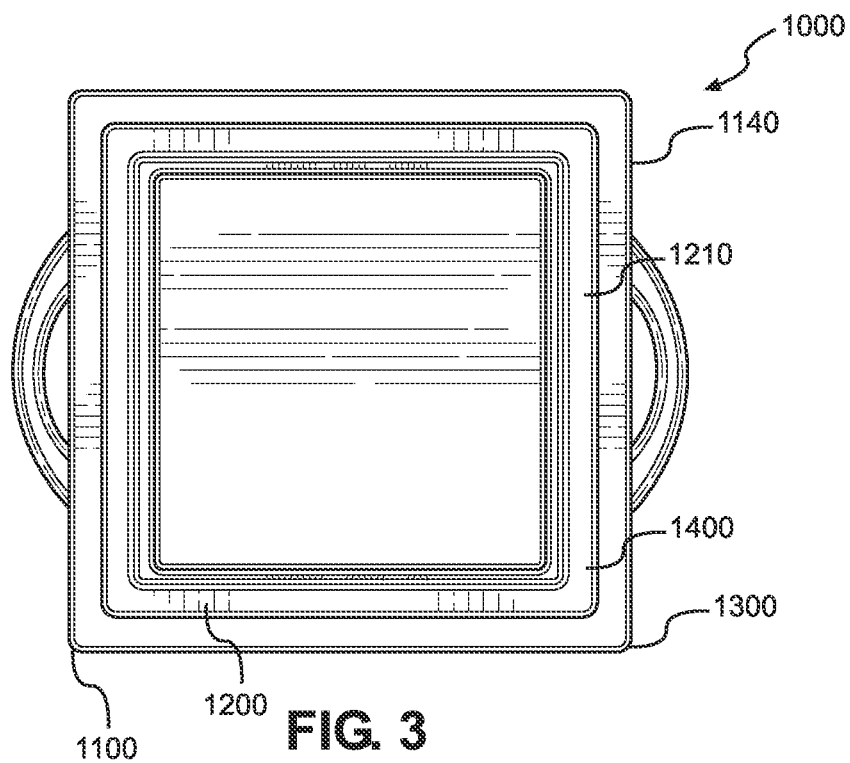
FIG. 3 shows a bottom planar view of the first embodiment of the moated system for repelling insects.

Referring now to FIGS. 1-3, there is shown an exploded view, a top planar view, and a bottom planar view of a first embodiment of the moated system for repelling insects, respectively. The moated system 1000 is a two-part having a first body 1100 forming rim 1110 disposed around a central area 1120. The rim 1110 referred to herein is defined as an outer edge and formed around another object, such as a dish, a container, a table, etc. In some embodiments, the rim 1110 is raised above the central area 1120, wherein other embodiments, the central area and rim form a level surface. In other embodiments, it is contemplated that the rim is positioned lower than the central area. The rim 1110 is configured to be any shape that corresponds with and encircles the outer edge of the object formed therewith. The central area 1120 is referred to herein is defined as any surface that is adapted to support an object thereon, such as food, drinks, servingware, and the like. A second body 1200 of the two-part moated system 1000 comprises a moat channel 1210 disposed beneath the rim 1110 in an in-use configuration and forms a barrier around the central area 1120. The moat channel 1210 is adapted to be filled with a liquid to prevent ants from passing the moat channel 1210 and entering the central area 1120. In this way, the ants will be prevented from crawling onto the central area of a dish or tabletop to access any food thereon. In the illustrated embodiment, the liquid is water. However, in alternate embodiments, the liquid is any suitable solution adapted to repel ants and other insects.

In all of the illustrated embodiments, a lip 1140 extends perpendicularly along a perimeter of an upper side 1130 of the rim 1110. The lip 1140 extends towards the moat channel 1210 and terminates past an upper end 1220 thereof. In this way, the moat channel 1210 is protected by preventing lateral access from an exterior to the moat channel. The lip 1140 also conceals the moat channel 1210 and liquid therein from being visible between the rim 1110 and the upper end 1220 thereof. This prevents users from having to see any unwanted or dead insects within the moat channel 1210.

Figure 7:
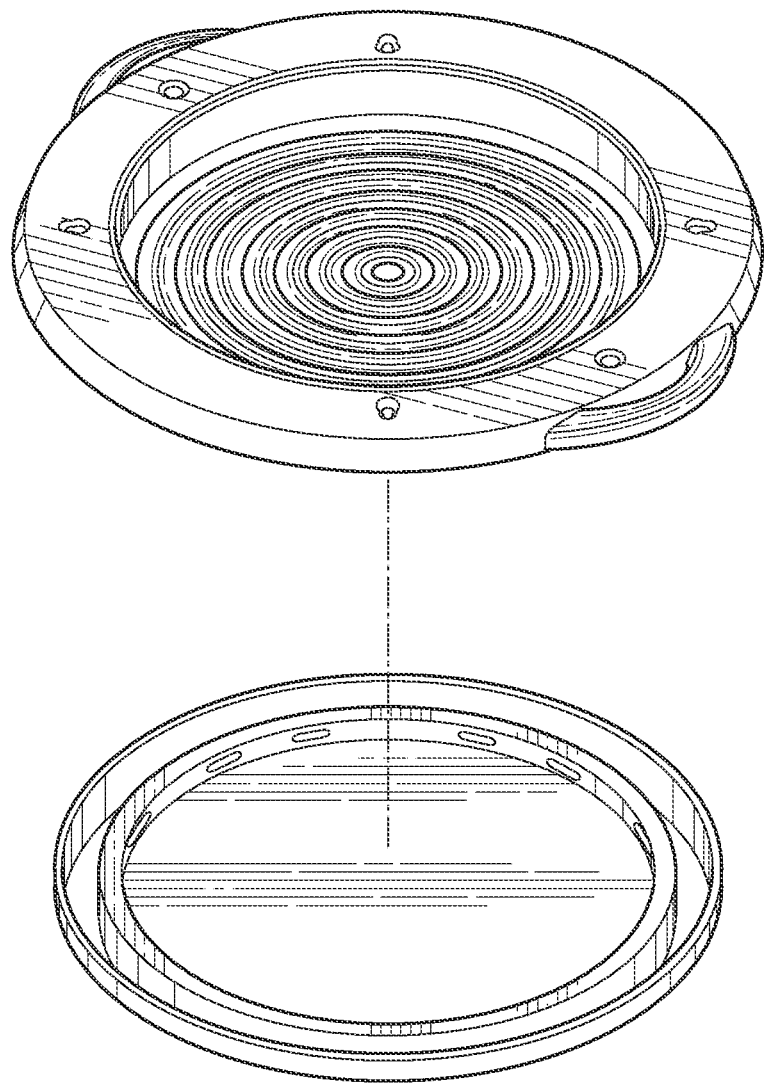
FIG. 7 shows an exploded view of a second embodiment of the moated system for repelling insects.

In the illustrated first embodiment, the first body 1100 of the moated system 1000 comprises a first housing 1300 having an interior compartment 1310 with an open upper end 1320 defined by a sidewall 1330 that extends therearound. In the first embodiment, the interior compartment 1310 comprises the central area 1120 that receives food therein. The rim 1110 extends about the perimeter of the upper end 1320 of the interior compartment 1310. In the illustrated embodiment, the first housing 1300 comprises a square cross-sectional shape. However, in alternate embodiments, the first housing 1300 comprises any suitable shape, such as a circular cross section (as shown in FIG. 7). The interior compartment 1310 shown in the first embodiment is shallow so as to serve as a serving platter that receives other dishware, such as pies dishes, casserole dishes, and the like, thereon. In other embodiments, the interior compartment is configured to have any suitable dimension or depth to correspond to the type of food product intended to be contained thereby. For example, the interior compartment comprises a larger depth to serve as a tureen intended to contain soups and stews. In some embodiments, the upper surface of the interior compartment 1310 is textured to prevent servingware placed thereon from sliding when the moated system 1000 is in transport. In the illustrated embodiment, the texture comprises a series of concentric ridges 1315.

In the illustrated embodiment, the first body 1100 includes a pair of handles 1170 extending from opposite sides of the lip. Each handle 1170 forms a gap 1180 for receiving a hand therethrough. However, in alternate embodiments, the handles 1170 extend from any suitable location of the first body. In other embodiments, the moating system does not include handles.

In the illustrated first embodiment, the second body 1200 of the moated system 1000 comprises a second housing 1400 having a recess 1410 disposed within an interior perimeter 1230 of the moat channel 1210, wherein the moat channel 1210 extends entirely around the recess 1410. The recess 1410 is configured to receive the interior compartment 1310 of the first housing 1300. In the illustrated embodiment, the recess 1410 comprises a sidewall 1420 having a substantially similar height, length, and width of the sidewall 1330 of the interior compartment 1310 of the first housing 1300. This enables the interior compartment 1310 to sit flush within the recess 1410 to allow the rim 1110 to be positioned directly over the moat channel 1210 when the housings 1300, 1400 are secured to one another in the in-use configuration. In other embodiments, the second body or second housing is void of a recess and comprises an open central area, wherein the moat channel is directly attached to the first body or first housing.

In the illustrated embodiments, the moated system 1000 comprises at least one filling port 1150 disposed through the upper side of the rim 1110. The filling port 1150 is in fluid communication with the moat channel 1210 and configured to provide access to the user for filling the moat channel with liquid through the filling port 1150. In the first embodiment, the first housing 1300 comprises a pair of filling ports 1150 disposed on opposite sides of the rim 1110. However, in alternate embodiments, the rim 1110 comprises any suitable number of filling ports 1150. In some embodiments, a plurality of filling ports 1150 are positioned about the rim 1110 equal distances from one another. The benefit of having multiple filling ports 1150 equally positioned about the rim 1110 is to view the moat channel 1210 through each filling port 1150 to determine if liquid in the moat channel 1210 is evenly distributed thereabout.

In the illustrated embodiment, a canopy 1500 is removably securable to the rim or first housing 1300 and configured to cover the central area 1120. In the illustrated embodiment, the canopy 1500 comprises a netting material 1510 disposed between a wire frame 1520. The distal ends 1530 of the wire frame 1520 are insertable into apertures 1540 disposed at each corner of the upper side of the rim 1110. In this way, the canopy provides additional protection from flying insects entering the interior compartment 1310 and accessing any food positioned within the central area 1120. In the illustrated embodiment, the canopy 1500 further comprises a hook 1550 positioned at the apex thereof for easily handling the canopy 1500 and a skirted base 1560 to overlap with the rim 1110 when secured thereto.

Figure 4:
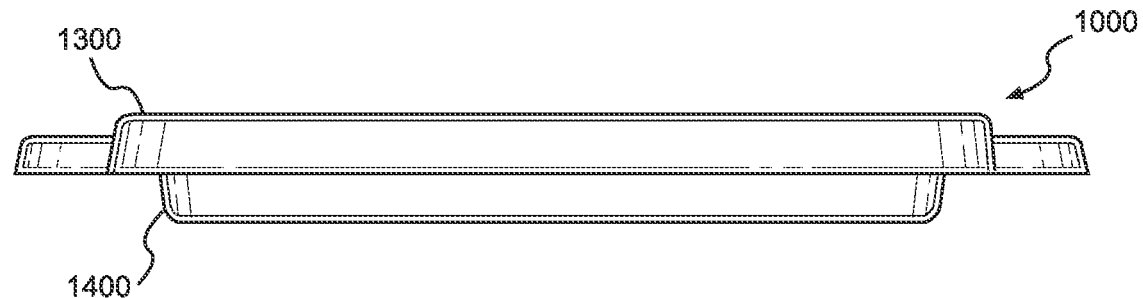
FIG. 4 shows a side view of the first embodiment of the moated system for repelling insects.
Figure 5:
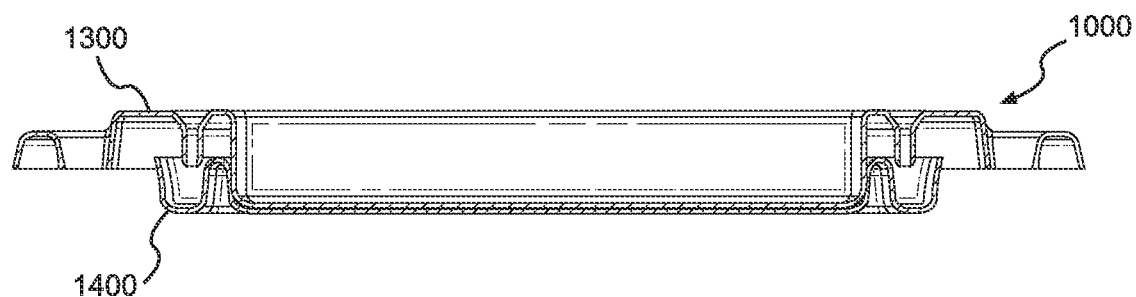
FIG. 5 shows a cross sectional view of the first embodiment of the moated system for repelling insects taken along line 5-5 of FIG. 2.
Figure 6:
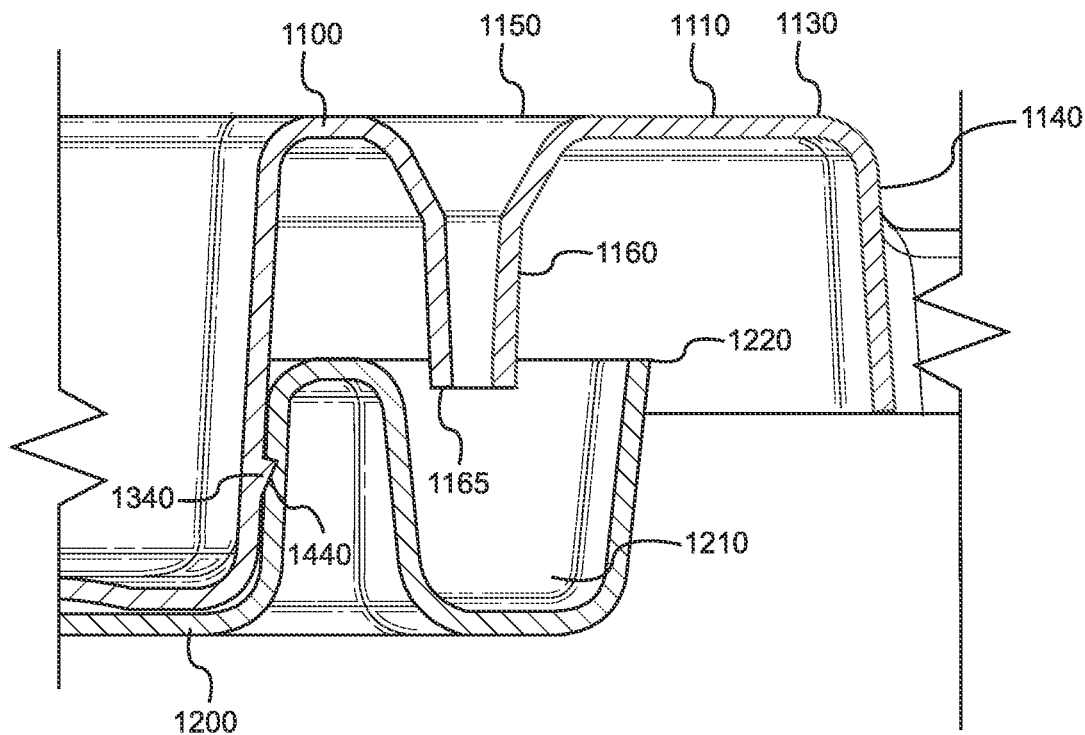
FIG. 6 shows a close-up view of the funnel and moat channel of the first embodiment of the moated system for repelling insects.

Referring now to FIGS. 4-6, there is shown a side view of the first embodiment of the moated system for repelling insects, a cross sectional view of the first embodiment of the moated system for repelling insects taken along line 5-5 of FIG. 2, and a close-up view of the funnel and moat channel of the first embodiment of the moated system for repelling insects, respectively. In the illustrated embodiment, the second housing 1400 is removably secured to the first housing 1300. In this way, the first body 1100 can be separated from the second body 1200 to allow the moat channel 1210 to be more easily accessed and cleaned apart from the lip 1140 and rim 1110 of the first body. In the illustrated embodiment, the first housing 1300 is secured to the second housing 1400 by interlocking fasteners 1340, 1440 disposed between the recess 1410 and the interior compartment 1310. However, in alternate embodiments with separable first and second bodies or housings, any suitable fastener is used, such as a friction fit. However, in alternate embodiments, the first housing is permanently affixed to the second housing.

In the illustrated embodiment, the filling port 1150 includes a funnel 1160 that protrudes therefrom and into the moat channel 1210 to indicate when the liquid level has reached a desired level within the moat channel 1210 without overflowing the edges of the moat channel 1210. The funnel 1160 tapers towards the moat channel 1210 such that a distal end 1165 of the funnel 1160 having the smallest diameter thereof, is positioned within the upper end 1220 of the moat channel 1210.

In the illustrated embodiment, the moat channel 1210 comprises a U-shape that forms a continuous channel extending entirely about the central area 1120, wherein the moat channel 1210 and the rim 1110 are co-extensive with one another.

In the illustrated embodiment, the lip 1140 is substantially parallel to an exterior sidewall 1215 of the moat channel 1215, wherein the lip 1140 is disposed on a different substantially vertical plane than the exterior sidewall 1215 of the moat channel 1210. In this way, the lip forms a gapped overhang 1145 that further conceals the moat channel 1210 from view.

Figure 8:
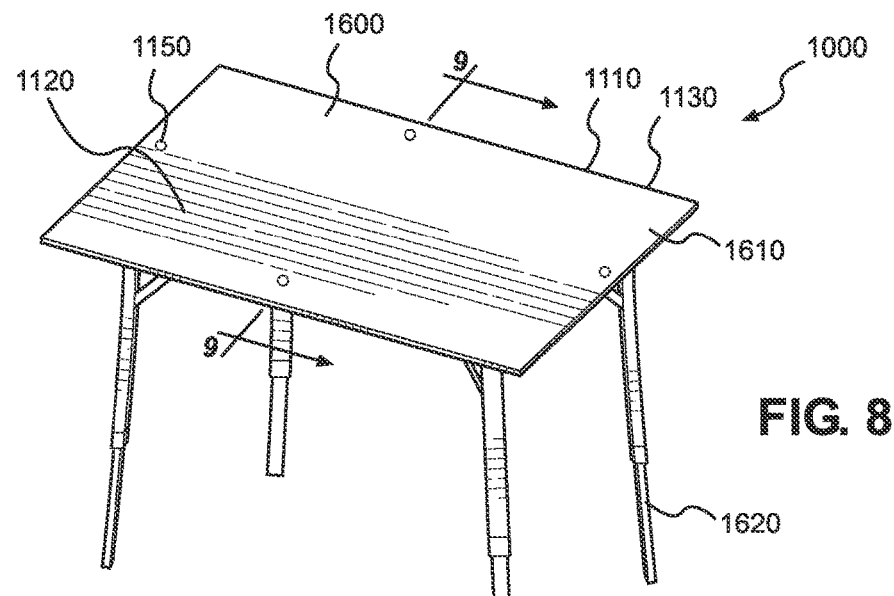
FIG. 8 shows a perspective view of a third embodiment of the moated system for repelling insects.
Figure 9:
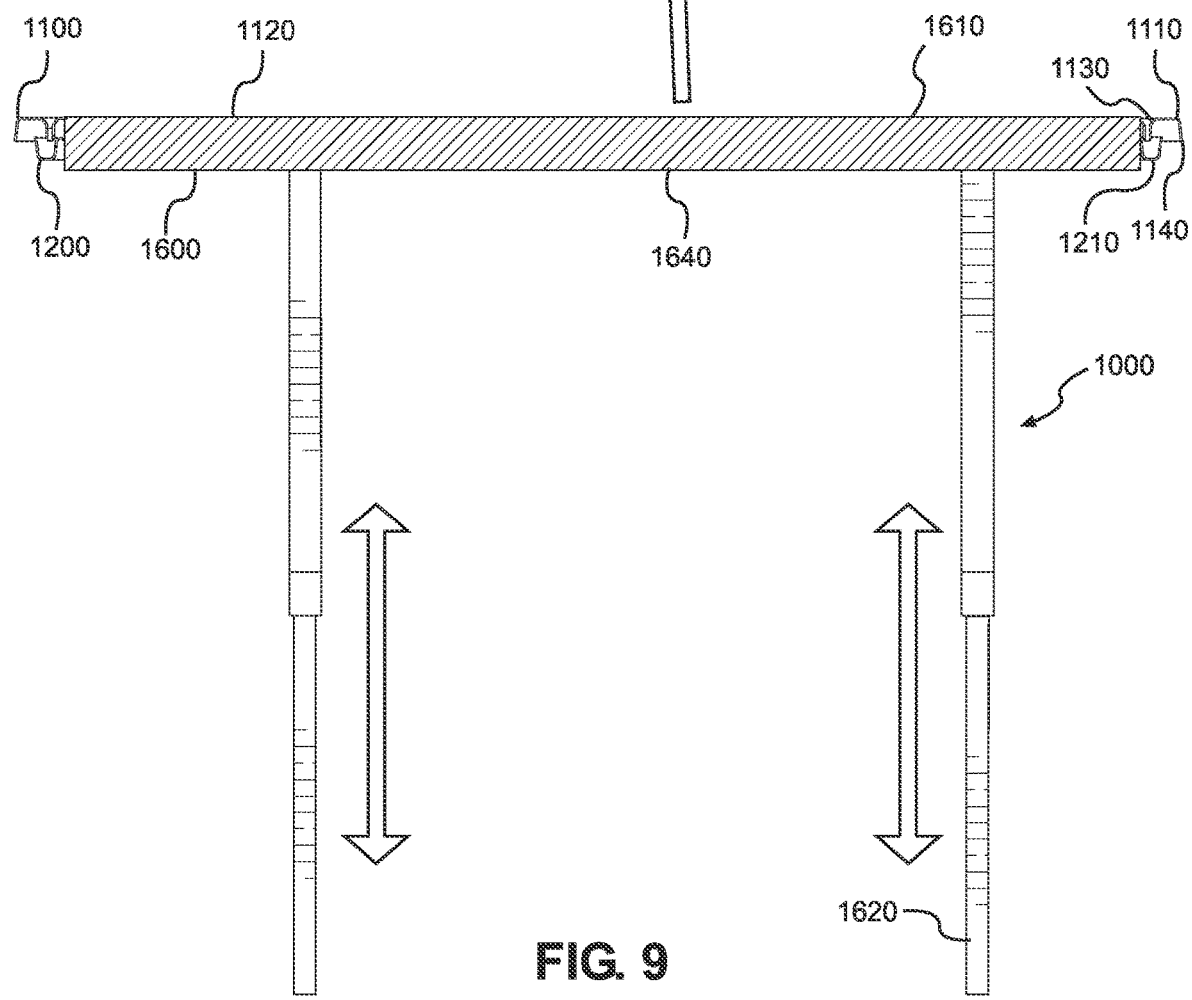
FIG. 9 shows a cross sectional view of the third embodiment of the moated system for repelling insects taken along line 9-9 of FIG. 8.

Referring now to FIGS. 8 and 9, there is shown a perspective view of a third embodiment of the moated system for repelling insects and a cross sectional view of the third embodiment of the moated system for repelling insects taken along line 9-9 of FIG. 8, respectively. In the illustrated embodiment, the rim 1110 of the first body 1100 of the moated system 1000 is disposed about a perimeter of a tabletop 1600 to prevent ants and other insects from accessing an upper surface 1610 thereof, wherein the upper surface 1610 comprises the central area 1120. In the illustrated embodiment, the upper side 1130 of the rim 1110 forms a continuous, level surface with the upper surface 1610 of the tabletop 1600. In the third embodiment, the tabletop 1600 comprises at least one leg support 1620 extending therefrom and configured to support the tabletop 1600 in an upright and horizontal position. In the illustrated embodiment, the leg support 1620 is adjustable in height via telescoping members 1630. However, in alternate embodiments, the leg support 1620 is adjustable by any suitable manner, including but not limited to, foldable sections. In some embodiments, the leg supports 1620 are pivotally mounted to the underside of the tabletop 1600 to allow for easy storage and transportation when camping, hunting, and the like.

In the illustrated third embodiment, the first and second bodies 1100, 1200 are integral with the tabletop 1600, wherein the rim 1110 including the lip 1140 have an appearance of being part of the upper surface of the tabletop 1600. In some embodiments, the second body 1200 including the moat channel 1210, extends directly from a lower end 1640 of the tabletop 1600, beneath the filling ports 1150 disposed within the rim 1110. In other embodiments, the moat channel 1210 extends directly from an underside of the rim 1110, as opposed to extending directly from a lateral side or lower end of the tabletop 1600. In the illustrated embodiment, the first body 1100 is not separable from the second body 1200. In some embodiments, a handle is disposed on at least one side of the tabletop to allow for more convenient carrying. In other embodiments, the handle is disposed on opposite sides of the tabletop, along an exterior face of the lip.

Figure 10:
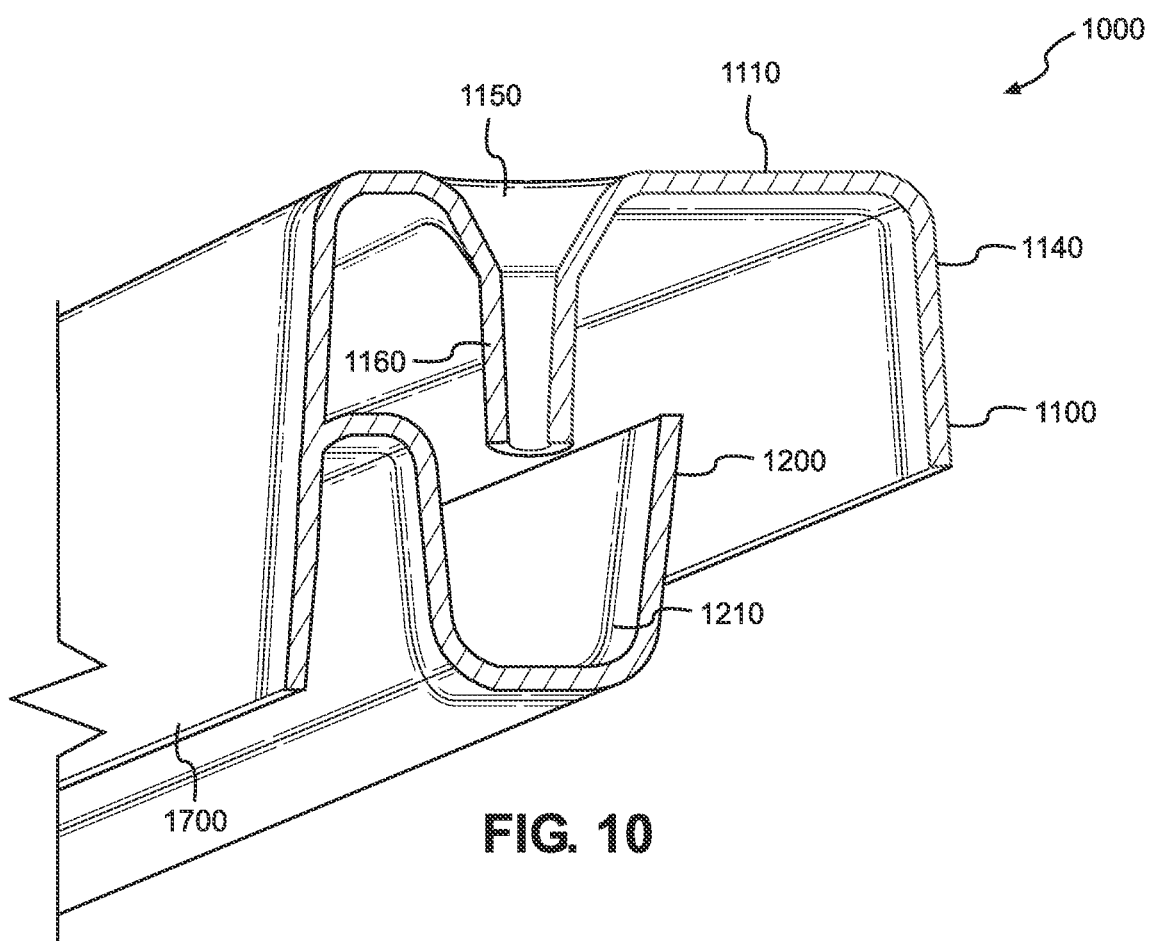
FIG. 10 shows a perspective view of a fourth embodiment of the moated system for repelling insects.

Referring now to FIG. 10, there is shown a perspective view of a fourth embodiment of the moated system for repelling insects. In alternate embodiments, the moated system 1000 is customizable and removably securable to a perimeter of a secondary device, such as a table. For example, the first body 1100 comprising the rim 1110 and lip 1140, wherein the filling ports 1150 with funnels 1160 are disposed through the upper side of the rim, is secured to the second body 1200 comprising the moat channel 1210. An interior side 1700 is formed between the rim 1110 and moat channel 1210, opposite but substantially parallel to the lip 1140. This interior side 1700 can be secured or adhered to a lateral side of the secondary device.

In operation, the moat channel 1210 is filled with a liquid, such as water, by pouring the water into the channel via a filling port 1150. The water flows into the continuous moat channel until the water is level begins to rise within the funnel. If the moat channel is filled completely with the water and cannot receive additional water without spilling over an edge thereof, the water will back fill the funnel and come back through the filling ports. This will signify to the user that the moat channel is filled and can no longer receive additional liquid. The filled moat channel serves to prevent ants from crawling passed the channel and onto the central area, whether the central area is an interior compartment of a level surface.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A moated system for repelling insects, comprising:
   a first body comprising a lip extending substantially perpendicularly along an upper side of a rim, wherein the rim encloses a central area;
   a second body comprising a moat channel extending about a lower side of the rim when the first and second bodies are joined together along the lower side of the first body and the upper side of the second body;
   wherein the moat channel is adapted to be filled with liquid to prevent ants from passing the moat channel and entering the central area of the first body;
   wherein the lip extends to the moat channel when the first and second bodies are joined;
   a filling port disposed through the upper side of the rim and positioned over the moat channel when the first and second bodies are joined; and
   wherein the filling port comprises a funnel that is secured thereto and tapers towards the moat channel;
   wherein a lowermost end of the funnel protrudes into the moat channel, such that filling of the moat channel causes the liquid to fill the funnel before overflowing the moat channel as a visual indicator of fullness.

2. The moated system of claim 1, wherein the moat channel forms a continuous channel extending entirely about the central area.

3. The moated system of claim 1, wherein the moat channel and the rim are co-extensive with one another.

4. The moated system of claim 1, wherein the lip is substantially parallel to an exterior sidewall of the moat channel, such that the lip is disposed on a different vertical plane than the exterior sidewall of the moat channel.

5. The moated system of claim 1, wherein the liquid is water.

6. The moated system of claim 1, wherein the first body further comprises a first housing having an interior compartment with an open upper end defined by the rim, wherein the central area is disposed within the interior compartment.

7. The moated system of claim 6, wherein the second body further comprises a second housing having a recess disposed within an interior perimeter of the moat channel, wherein the recess is configured to receive the interior compartment of the first housing.

8. The moated system of claim 7, wherein the first housing is removably secured to the second housing.

9. The moated system of claim 7, wherein the first housing is removably secured to the second housing via a series of interlocking fastener disposed between the recess and the interior compartment.

10. The moated system of claim 7, wherein an outer surface of the recess is adapted to rest flush on a flat surface and support the second housing in an upright position.

11. The moated system of claim 7, wherein the moat channel forms a continuous channel extending entirely about the central area.

12. The moated system of claim 7, wherein the moat channel and the rim are co-extensive with one another.

13. The moated system of claim 1, wherein the first body includes a pair of handles extending from opposite sides of the lip.

14. The moated system of claim 1, wherein the rim comprises a plurality of apertures adapted to receive a frame of a canopy configured to prevent flying insects and debris from entering the interior compartment.

15. The moated system of claim 1, wherein the rim extends around a tabletop comprising at least one leg support extending from the tabletop and configured to support the tabletop in a horizontal position.

16. The moated system of claim 15, wherein the at least one leg support is adjustable in height.

17. The moated system of claim 15, wherein the moat channel forms a continuous channel extending entirely about the central area.

18. The moated system of claim 15, wherein the moat channel and the rim are co-extensive with one another.

19. The moated system of claim 1, wherein an upper end of the funnel terminates at the filling port.

* * * * *